(12) United States Patent
Hecker et al.

(10) Patent No.: US 7,396,029 B2
(45) Date of Patent: Jul. 8, 2008

(54) AIR-SUSPENSION DEVICE FOR VEHICLES, IN PARTICULAR FOR COMMERCIAL VEHICLES

(75) Inventors: Falk Hecker, Markgröningen (DE); Günther Fecht, Freiberg (DE); Friedbert Röther, Cleebronn (DE); Winfried Geiger, Mühlacker (DE)

(73) Assignee: Knorr-Bremse Systeme fur Nutzfahrzeuge GmbH, Munich (DE)

( * ) Notice: Subject to any disclaimer, the term of this patent is extended or adjusted under 35 U.S.C. 154(b) by 332 days.

(21) Appl. No.: 11/150,763

(22) Filed: Jun. 10, 2005

(65) Prior Publication Data

US 2006/0033299 A1     Feb. 16, 2006

(30) Foreign Application Priority Data

Jun. 11, 2004   (DE) ................ 10 2004 028 325

(51) Int. Cl.
*B60G 17/04*   (2006.01)
*B60G 11/27*   (2006.01)
(52) U.S. Cl. ............... 280/124.16; 280/6.157
(58) Field of Classification Search .......... 280/124.157, 280/124.16, 6.157, 6.159; 267/64.11
See application file for complete search history.

(56) References Cited

U.S. PATENT DOCUMENTS

| | | | | |
|---|---|---|---|---|
| 4,953,890 A * | 9/1990 | Kamimura | ............... | 280/5.507 |
| 5,273,308 A * | 12/1993 | Griffiths | ................. | 280/6.151 |
| 5,472,227 A * | 12/1995 | Schonfeld et al. | ........... | 280/683 |
| 5,794,924 A * | 8/1998 | Stolpp | ..................... | 267/64.11 |
| 6,173,974 B1 * | 1/2001 | Raad et al. | ............... | 280/6.157 |

(Continued)

FOREIGN PATENT DOCUMENTS

DE       43 27 764       2/1995

(Continued)

*Primary Examiner*—Christopher Bottorff
*Assistant Examiner*—Joseph Rocca
(74) *Attorney, Agent, or Firm*—Kenyon & Kenyon LLP

(57) ABSTRACT

An air-suspension device for vehicles, e.g., commercial vehicles, includes a valve block that is assigned to a rear axle and contains a central valve for aerating and venting air-spring bellows of the rear axle, and a valve block assigned to a front axle for aerating and venting air-spring bellows of the front axle. The central valve of the valve block assigned to the rear axle selectively connects: a) a compressed-air supply to the air-spring bellows of the rear axle and to a supply-pressure connection of the valve block assigned to the front axle; or b) the supply-pressure connection of the valve block assigned to the front axle and the air-spring bellows of the rear axle to an air vent. The valve block assigned to the front axle has a pneumatic pilot-operation connection for pneumatic-electric pilot operation. The pneumatic pilot-operation connection of the valve block assigned to the front axle is connected to a pressure outlet of a selector-valve device, of which one pressure inlet is connectable, via the central valve of the valve block assigned to the rear axle, either to the compressed-air supply or to the air vent, and the other pressure inlet is connectable to at least one of the air-spring bellows of the front axle. The selector-valve device switches through, in each instance, the higher of the pressures applied to its pressure inlets to the pressure outlet. By this arrangement, the need for pneumatic lines is eliminated.

13 Claims, 2 Drawing Sheets

U.S. PATENT DOCUMENTS 6,179,310 B1 * 1/2001 Clare et al. ............ 280/124.159
6,189,903 B1 * 2/2001 Bloxham ................ 280/124.16
6,264,213 B1 * 7/2001 Kutscher ................. 280/5.514

FOREIGN PATENT DOCUMENTS

| | | |
|---|---|---|
| DE | 195 15 255 | 10/1996 |
| DE | 101 63 379 | 7/2003 |
| DE | 102 45 815 | 4/2004 |

* cited by examiner

AIR-SUSPENSION DEVICE FOR VEHICLES, IN PARTICULAR FOR COMMERCIAL VEHICLES

FIELD OF THE INVENTION

The present invention relates to an air suspension device for vehicles, in particular for commercial vehicles, which suspension device includes a control valve for aerating and venting air-spring bellows of an axle.

BACKGROUND INFORMATION

A known air-suspension device 101 shown in FIG. 1 includes a valve block 102 that is assigned to a rear axle and contains a central 3/2-way directional control valve 104 for aerating and venting air-spring bellows 106 of the rear axle, and a valve block 108 assigned to a front axle, for aerating and venting air-spring bellows 110 of the front axle.

Central 3/2-way directional control valve 104 of valve block 102 assigned to the rear axle either connects a compressed-air supply 112 to pressure inlets 114 of downstream 2/2-way directional control valves 116, 118, which are each assigned to one vehicle side of the rear axle, and whose pressure outlets are connected, for their part, to air-spring bellows 106 of the rear axle, and to a supply-pressure connection 120 of valve block 108 assigned to the front axle, or connects this supply-pressure connection 120 and pressure inlets 114 of 2/2-way directional control valves 116, 118 to an air vent 26. The two 2/2-way directional control valves 116, 118 either connect rear axle air-spring bellows 106 assigned to them to a pressure outlet 122 of central 3/2-way directional control valve 104 or block such a connection.

Valve block 108 assigned to the front axle likewise contains a 3/2-way directional control valve 124, which, depending on its switching position, either connects its supply-pressure connection 120 to connections 126, 128 of air-spring bellows 110 of the front axle or, in a driving position, interconnects the two connections 126, 128 via a throttle 130 and blocks supply-pressure connection 120.

The 3/2-way directional control valve 124 of valve block 108 assigned to the front axle, central 3/2-way directional control valve 104, as well as the two 2/2-way directional control valves 116, 118 of valve block 102 assigned to the rear axle, take the form of pneumatically pilot-operated solenoid valves, i.e., they are each controlled by a relay valve, which is not shown for reasons of scale and is controlled, for its part, electrically. To this end, pilot-operation connections 132, 133 of these valves are connected to compressed-air supply 112 via pneumatic lines 134, 136; in particular, a pneumatic line 136 runs from compressed-air supply 112 to pilot-operation connection 133 of 3/2-way directional control valve 124 of valve block 108 assigned to the front axle.

Published German patent document DE 101 63 379 describes an air-suspension system having a plurality of bellows, which are selectively connectable to at least one source of pressure via one or more valve configurations. This air-suspension system has a pressure sensor and a pressure-sensing valve configuration, which is provided for selectively connecting the pressure sensor to at least some of the bellows.

SUMMARY OF THE INVENTION

In accordance with the present invention, the pneumatic pilot-operation connection of the valve block assigned to the front axle is connected to a pressure outlet of a selector-valve device, of which one pressure inlet is connectable, via the central valve of the valve block assigned to the rear axle, either to the compressed-air supply or to the air vent, and the other pressure inlet is connectable to at least one of the air-spring bellows of the front axle, and the selector-valve device switches through, in each instance, the greater of the pressures applied to the pressure inlets, to the pressure outlet. In this manner, pneumatic line 136 (shown in FIG. 1) from compressed-air supply 112 to pilot-operation connection 133 of 3/2-way directional control valve of the valve block assigned to the front axle may be eliminated, since the pneumatic pilot-operation connection of the 3/2-way directional control valve of the valve block assigned to the front axle is powered either by at least one air-spring bellows of the front axle or by the compressed-air supply via the correspondingly switched-through, central 3/2-way directional control valve of the valve block assigned to the rear axle, using the necessary pilot-operation pressure. The elimination of the need for the above-mentioned pneumatic line 136 shown in FIG. 1 lowers the pipe-work (tubing) expenditure and the number of required pipe fittings.

In accordance with an example embodiment of the present invention, the selector-valve device may be combined with the 3/2-way directional control valve of the valve block assigned to the front axle to form a unit, which arrangement provides a very compact, space-saving design.

DETAILED DESCRIPTION

Figure 1:
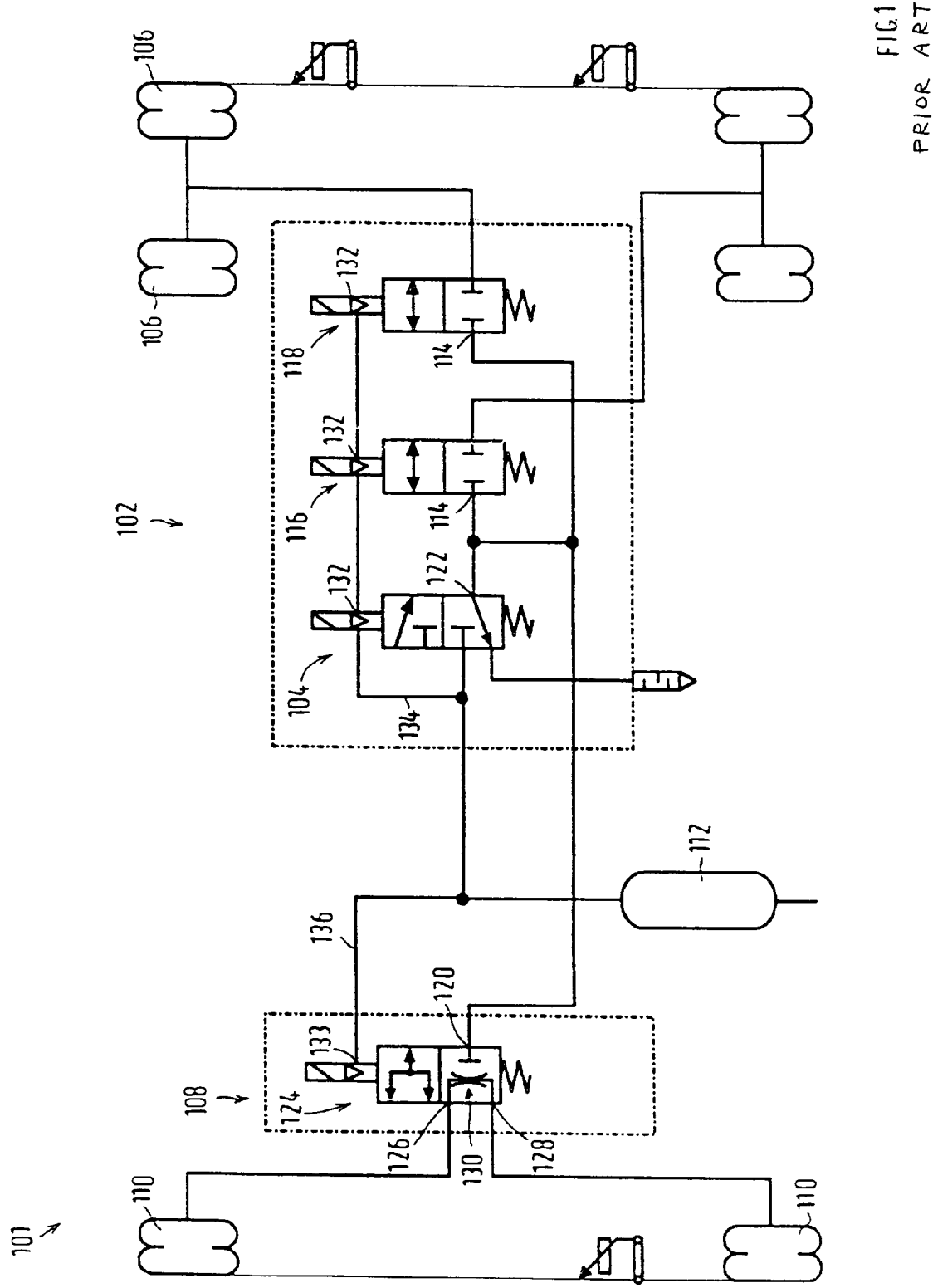
FIG. 1 shows a schematic electro-mechanical circuit diagram of a conventional air-suspension device.
Figure 2:
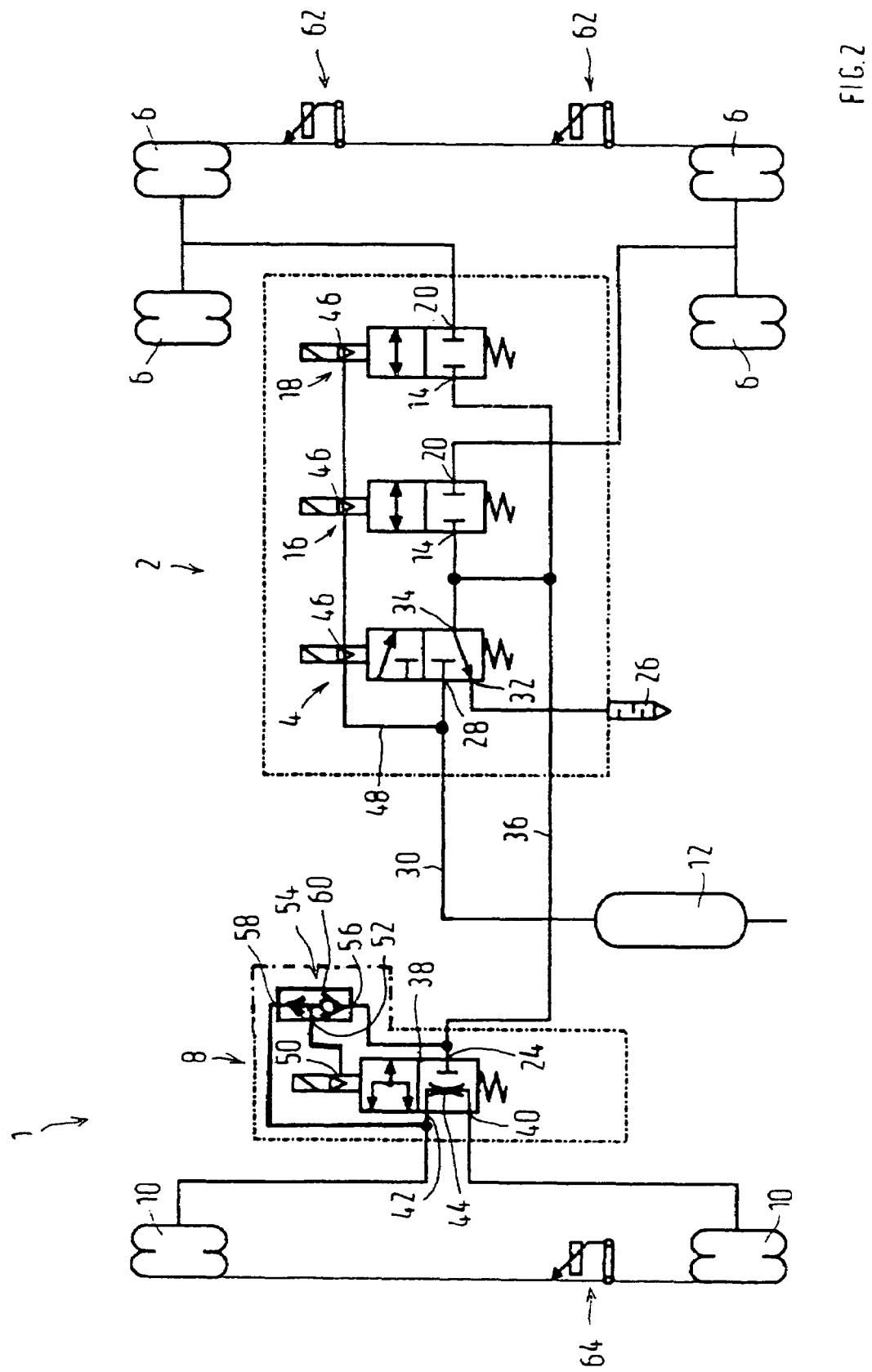
FIG. 2 shows a schematic electro-mechanical circuit diagram of an air-suspension device according to an example embodiment of the present invention.

An air-suspension device of a commercial vehicle, which device is designated by reference numeral 2 in FIG. 2, includes a valve block 2 that is assigned to a rear axle and contains a central 3/2-way directional control valve 4 for aerating and venting air-spring bellows 6 of the rear axle, and a valve block 8 assigned to a front axle for aerating and venting air-spring bellows 10 of the front axle.

Central 3/2-way directional control valve 4 of valve block 2 assigned to the rear axle either connects a compressed-air supply 12 to pressure inlets 14 of downstream 2/2-way directional control valves 16, 18, which are assigned to air-spring bellows 6, one per vehicle side of the rear axle, and whose pressure outlets 20 are connected, for their part, to air-spring bellows 6 of the rear axle, and to a supply-pressure connection 24 of valve block 8 assigned to the front axle, or connects this and pressure inlets 14 of 2/2-way directional control valves 16, 18 to an air vent 26. To this end, a pressure inlet 28 of central 3/2-way directional control valve 4 is connected to compressed-air supply 12 by a supply-pressure line 30, and a venting connection 32 is connected to air vent 26. Pressure outlet 34 of 3/2-way directional control valve 4 is also connected, via a pressure line 36, to supply-pressure connection 24 of valve block 8 assigned to the front axle. The two 2/2-way directional control valves 16, 18 either connect rear axle air-spring bellows 6 assigned to them to pressure outlet 34 of central 3/2-way directional control valve 4, or block such a connection.

Valve block 8 assigned to the front axle likewise contains a 3/2-way directional control valve 38, which, depending on its switching position, either connects its supply-pressure connection 24 to connections 40, 42 of air-spring bellows 10 of the front axle or, in a driving position, interconnects the two connections 40, 42 via a throttle 44 and blocks supply-pressure connection 24.

The 3/2-way directional control valve 38 of valve block 8 assigned to the front axle, central 3/2-way directional control valve 4, and the two 2/2-way directional control valves 16, 18 of valve block 2 assigned to the rear axle take the form of pneumatically pilot-operated solenoid valves, i.e., they are each controlled by a relay valve, which is not shown for reasons of scale and is controlled, for its part, electrically. The electric drive circuit is also not shown for reasons of scale. To supply compressed air for the pilot operation, with the exception of 3/2-way directional control valve 38 of valve block 8 assigned to the front axle, each control connection 46 of remaining valves 4, 16, 18 is connected to compressed-air supply 12 via a pneumatic line 48.

However, the pneumatic pilot-operation connection 50 of 3/2-way directional control valve 38 of valve block 8 assigned to the front axle is connected to a pressure outlet 52 of a selector-valve device 54, by which a pressure inlet 56 is connectable either to the compressed-air supply 12 or to air vent 26 via central 3/2-way directional control valve 4 of valve block 2 assigned to the rear axle, and by which other pressure inlet 58 is connectable to at least one of air-spring bellows 10 of the front axle. In this context, selector-valve device 54 connects, in each instance, the greater of the pressures applied to pressure inlets 56, 58 to its pressure outlet 52, in that a switching element 60 opens or closes the flow path in question. Selector-valve device 54 is preferably integrated into 3/2-way directional control valve 38 of valve block 8 assigned to the front axle.

With the aid of rotary potentiometers 62 and 64 on the rear axle and the front axle, respectively, a level sensor measures the distance between the specific vehicle axle and the vehicle body, the voltage taps of the rotary potentiometers being connected to the respective vehicle axes by one control lever each. The level sensor is connected to an electronic control unit which is not shown.

In the context of the above-described arrangement, the operation of the air-suspension device 1 according to the present invention is described below.

Once a vehicle is loaded, then air-spring bellows 6, 10 are compressed and the vehicle body is lowered. The levers connected to the vehicle axes rotate the sliders of rotary potentiometers 62, 64 on the specific potentiometer path into the "raising" position. The control unit detects the voltage deviation and transmits electrical actuating signals to the two 2/2-way directional control valves 16, 18 and to 3/2-way directional control valve 4 of valve block 2 assigned to the rear axle, as well as to 3/2-way directional control valve 38 of valve block 8 assigned to the front axle.

The 3/2-way directional control valve 4 of valve block 2 assigned to the rear axle then switches into its aeration position, in which compressed-air supply 12 is connected to pressure inlets 14 of downstream 2/2-way directional control valves 16, 18, which, for their part, redirect this pressure to air-spring bellows 6 of the rear axle. At the same time, this pressure is also routed by pressure line 36 into supply-pressure connection 24 of 3/2-way directional control valve 38 of valve block 8 assigned to the front axle. The pressure of compressed-air supply 12 is also simultaneously applied to pressure inlet 56 of selector-valve device 54 via pressure line 36. This pressure is always higher than the pressure, which is applied to pressure inlet 58 and prevails in air-spring bellows 10 of the front axle, which means that the resulting differential pressure pushes switching element 60 into a position in which the flow path through pressure line 36 between compressed-air supply 12 and pilot-operation connection 50 of 3/2-way directional control valve 38 of valve block 8 assigned to the front axle is open. The relay-valve device of this 3/2-way directional control valve 38 is then supplied with pilot-operation pressure and, in response to the electrical control signal of the control unit, may also be switched into its through position, in which supply-pressure connection 24 is switched through to connections 40, 42 of air-spring bellows 10 of the front axle. By this means, air-spring bellows 10 of the front axle are ultimately aerated, as well, and the vehicle body as a whole is raised to the desired setpoint level. By appropriately controlling 2/2-way directional control valves 16, 18 of valve block 2 assigned to the rear axle, the levels of the two vehicle sides may be variably adjusted, which may be necessary in the case of eccentric loading.

In the driving position, i.e., when the level of the vehicle body is adjusted to the setpoint level, all solenoid valves 4, 16, 18, 38 are unenergized and in switching positions, in which connections 28, 40, and 42 are blocked from compressed-air supply 12 and air vent 26, which means that no compressed air may flow into or out of air-spring bellows 6, 10.

To lower the level of the vehicle body, the levers connected to the vehicle axles rotate the sliders of rotary potentiometers 62, 64 on the respective potentiometer paths, into the "lowering" position. The control unit detects the voltage deviation and transmits electrical actuating signals to 2/2-way directional control valves 16, 18 and 3/2-way directional control valve 4 of valve block 2 assigned to the rear axis, as well as to 3/2-way directional control valve 38 of valve block 8 assigned to the front axle.

As a result, 3/2-way directional control valve 4 of valve block 2 assigned to the rear axle switches into its venting position, in which pressure inlets 14 of switched-through 2/2-way directional control valves 16, 18, and pressure line 36 extending to supply-pressure connection 24 of additionally switched-through 3/2-way directional control valve 38 of valve block 8 assigned to the front axle, are connected to air vent 26. Consequently, the pressure in air-spring bellows 6 of the rear axle is reduced. At the same time, the pressure in pressure line 36 also falls, which is now less than the pressure in air-spring bellows 10 of the front axle, which is why switching element 60 of selector-valve device 54 changes its position and now blocks the flow path between pilot-operation connection 50 of 3/2-way directional control valve 38 of valve block 8 assigned to the front axle, and compressed-air supply 12, but opens the flow path between this pilot-operation connection 50 and air-spring bellows 10 of the front axle, so that the pressure prevailing in air-spring bellows 10 is now applied as the pilot-operation pressure to pilot-operation connection 50 of 3/2-way directional control valve 38 of valve block 8 assigned to the front axle. Apart from that, the switched-through position of this valve 38 does not change, which means that, until a setpoint level is reached, air-spring bellows 10 of the front axle are vented via open 3/2-way directional control valve 38, pressure line 36, as well as 3/2-way directional control valve 4, which belongs to valve block 2 assigned to the rear axle and is connected to air vent 26.

What is claimed is:

1. An air-spring device for a vehicle, comprising:
   a first valve block assigned to a rear axle, the first valve block including a central valve for aerating and venting air-spring bellows of the rear axle;
   a second valve block assigned to a front axle, for aerating and venting air-spring bellows of the front axle, wherein the valve block assigned to the front axle includes a pneumatic pilot-operation connection for pneumatic-electric pilot operation; and a selector-valve device having a pressure outlet and at least a first pressure inlet and a second pressure inlet;

wherein the central valve of the first valve block assigned to the rear axle selectively connecting one of: a) a compressed-air supply, to both i) the air-spring bellows of the rear axle, and ii) a supply-pressure connection of the second valve block assigned to the front axle; and b) both i) the supply-pressure connection of the second valve block assigned to the front axle, and ii) the air-spring bellows of the rear axle, to an air vent; and wherein the pneumatic pilot-operation connection of the second valve block assigned to the front axle is connected to the pressure outlet of the selector-valve device, whereby the first pressure inlet is connectable, via the central valve of the second valve block assigned to the rear axle, to one of the compressed-air supply and the air vent, and the second pressure inlet is connectable to at least one of the air-spring bellows of the front axle, and wherein the selector-valve device switches through the higher of the pressures applied to the first and second pressure inlets to the pressure outlet.

2. The air-suspension device as recited in claim 1, wherein the central valve of the first valve block assigned to the rear axle is a 3/2-way directional control valve which has pneumatic-electric pilot operation, and wherein a pressure outlet of the 3/2-way directional control valve is connected to each pressure inlet of at least two downstream 2/2-way directional control valves which are assigned to opposite vehicle sides and selectively perform one of blocking and switching through a connection to air-spring bellows of the rear axle on the respective vehicle side.

3. The air-suspension device as recited in claim 2, wherein the pneumatic pilot-operation connection includes an electrically controlled relay-valve device.

4. The air-suspension device as recited in claim 2, wherein the second valve block assigned to the front axle is switchable in a manner such that the air-spring bellows of the front axle are one of interconnected via a throttle device and connected to the supply-pressure connection of the second valve block.

5. The air-suspension device as recited in claim 2, wherein the second valve block assigned to the front axle includes a 3/2-way directional control valve.

6. The air-suspension device as recited in claim 5, wherein the selector-valve device is combined with the 3/2-way directional control valve of the second valve block assigned to the front axle to form a unit.

7. The air-suspension device as recited in claim 1, wherein the pneumatic pilot-operation connection includes an electrically controlled relay-valve device.

8. The air-suspension device as recited in claim 7, wherein the second valve block assigned to the front axle is switchable in a manner such that the air-spring bellows of the front axle are one of interconnected via a throttle device and connected to the supply-pressure connection of the second valve block.

9. The air-suspension device as recited in claim 7, wherein the second valve block assigned to the front axle includes a 3/2-way directional control valve.

10. The air-suspension device as recited in claim 9, wherein the selector-valve device is combined with the 3/2-way directional control valve of the second valve block assigned to the front axle to form a unit.

11. The air-suspension device as recited in claim 1, wherein the second valve block assigned to the front axle is switchable in a manner such that the air-spring bellows of the front axle are one of interconnected via a throttle device and connected to the supply-pressure connection of the second valve block.

12. The air-suspension device as recited in claim 1, wherein the second valve block assigned to the front axle includes a 3/2-way directional control valve.

13. The air-suspension device as recited in claim 12, wherein the selector-valve device is combined with the 3/2-way directional control valve of the second valve block assigned to the front axle to form a unit.

* * * * *